US011057552B2

(12) United States Patent
Lee

(10) Patent No.: US 11,057,552 B2
(45) Date of Patent: Jul. 6, 2021

(54) FACE-ONLY PHOTO BOOTH

(71) Applicant: Sangseok Lee, Seoul (KR)

(72) Inventor: Sangseok Lee, Seoul (KR)

( * ) Notice: Subject to any disclaimer, the term of this patent is extended or adjusted under 35 U.S.C. 154(b) by 104 days.

(21) Appl. No.: 16/479,270

(22) PCT Filed: Jan. 3, 2018

(86) PCT No.: PCT/KR2018/000083
§ 371 (c)(1),
(2) Date: Jul. 19, 2019

(87) PCT Pub. No.: WO2018/135778
PCT Pub. Date: Jul. 26, 2018

(65) Prior Publication Data
US 2019/0387146 A1 Dec. 19, 2019

(30) Foreign Application Priority Data

Jan. 23, 2017 (KR) .................. 10-2017-0010494

(51) Int. Cl.
H04N 5/225 (2006.01)
H04N 5/232 (2006.01)

(52) U.S. Cl.
CPC ......... *H04N 5/2257* (2013.01); *H04N 5/2252* (2013.01); *H04N 5/2256* (2013.01); *H04N 5/23203* (2013.01)

(58) Field of Classification Search
CPC .. H04N 5/2257; H04N 5/2252; H04N 5/2256; H04N 5/23203; H04N 5/2251; H04N 5/225; G03B 17/566

USPC ................................... 348/373-375
See application file for complete search history.

(56) References Cited

U.S. PATENT DOCUMENTS

2007/0212038 A1 9/2007 Asai et al.
2011/0000805 A1* 1/2011 Ho .................. G03B 17/08
                                                       206/320
2013/0208102 A1* 8/2013 Kim ................... A61B 5/70
                                                         348/77
2014/0313358 A1* 10/2014 Yu ................. H04N 5/23203
                                                       348/211.7

FOREIGN PATENT DOCUMENTS

JP        2008-161322 A     7/2008
KR   10-2007-0011361 A      1/2007
KR   10-2010-0034807 A      4/2010
KR         101348709    * 12/2013
KR       10-1348709 B1      1/2014
KR   10-2014-0129864 A     11/2014

* cited by examiner

Primary Examiner — Lin Ye
Assistant Examiner — Chan T Nguyen
(74) Attorney, Agent, or Firm — Rabin & Berdo, P.C.

(57) ABSTRACT

The present invention relates to a face-only photo booth, which includes: a housing having a tubular wall, a first side having a through-hole on a side of the wall, and an opening formed on the other side of the wall such that a person to be photographed can put a face therein; a clamp brining a mobile terminal in close contact with the first side such that a camera of the mobile terminal can be aligned with the through-hole of the housing; a light source disposed on an inner surface of the first side of the housing; and an operation button disposed on an outer side of the wall to input a photographing signal of the mobile terminal.

10 Claims, 7 Drawing Sheets

FACE-ONLY PHOTO BOOTH

TECHNICAL FIELD

The present invention relates to a face-only photo booth, particularly a face-only photo booth using a mobile terminal.

BACKGROUND ART

In general, dermatologists give medical treatment by photographing the face of patients through face measuring apparatuses. It is possible to photograph the face using a photographing device of a face measuring apparatus and the photographed images can be used to compare the states of freckles, pimples, and other skin diseases on the face of patients before and after treatment or compare the states before and after facial plastic surgery.

Patent Document 1 proposes an "apparatus for self-photographing a face image" for an ocular inspection, which has to unavoidably have a complicated structure that has to electrically connect an image controller that transmits image data to a display through a photographing unit, a distance measurer that measures the distance between a face and a displayed image, and a distance controller that adjusts the distance between the photographing unit and a face.

DISCLOSURE

Technical Problem

The present invention has been made in an effort to solve the problems and an object of the present invention is to provide a face-only photo booth that can photograph an object, particularly, the face of a person to be photographed through a mobile terminal with a camera.

Technical Solution

In order to achieve the objects, a face-only photo booth according to an embodiment of the present invention includes:

a housing having a tubular wall, a first side having a through-hole on a side of the wall, and an opening formed on the other side of the wall such that a face of a person to be photographed can be put therein; a clamp bringing a mobile terminal in close contact with the first side such that a camera of the mobile terminal can be aligned with the through-hole of the housing; a light source disposed on an inner surface of the first side of the housing; and an operation button disposed on an outer side of the wall to input a photographing signal of the mobile terminal.

The light source may have a plurality of LED devices mounted on a printed circuit board, a USB cable supplying low power of the mobile terminal to the light source, and a USB terminal connected to an end of the USB cable and being coupled to a USB socket of the mobile terminal.

A second through-hole may be formed in an inside area of the light source to correspond to the through-hole.

The LED devices of the light source may radiate light to a face of a person to be photographed through white LEDs and UV LEDs.

The present invention may have an operation button having a cable transmitting a photographing signal from the operation button to the mobile terminal, and an ear jack connected to an end of the cable and being coupled to an earphone socket of the mobile terminal.

The opening may have a chin support supporting a chin of a person to be photographed, and a forehead support supporting a forehead of the person to be photographed.

A clamp may be disposed over the through-hole of the first side.

The clamp may further have a nonslip pad made of an elastic material on an inner surface that comes in contact with the mobile terminal.

The housing may further have a ring-shaped sealing portion made of an elastic material and disposed around an edge of the through-hole of the first side.

The present invention may further have one or more spacers protruding outward from a portion under the through-holes of the first side.

The ring-shaped sealing portion and the one or more spacers protrude at the same height, so the first side of the housing and the mobile terminal may be arranged in parallel.

Advantageous Effects

According to the present invention, there is provided a face-only photo booth designed to enable a person to be photographed to photograph himself/herself.

In particular, according to the present invention, it is possible to photograph the face of a person to be photographed with a mobile terminal having a camera detachably fixed to the outer surface of a first side, which faces the face of the person to be photographed, of a housing. The present invention can provide a face photographing apparatus (face measuring apparatus at a low cost because the face of a person to be photographed is photographed by a camera disposed in a mobile terminal and there is no need for a separate expensive camera module. Further, external interference is blocked, and the distance between a camera and a face and the kind and light amount of light sources are uniform, so images that have high quality and are consistent can be obtained.

Further, the present invention provides also an advantage in that a person to be photographed can compare the states of freckles, pimples, and other skin diseases on the face before and after treatment or can easily check the states before and after facial plastic surgery through the face image stored in a mobile terminal.

The present invention can preclude unexpected leakage of personal information by storing a face image of a photographed person in a mobile terminal of the person.

According to the present invention, it is possible to accurately photograph the face of a person to be photographed by uniformly radiating light to the face of the person through a light source including LED devices and disposed in a housing.

Further, the present invention has a structure that includes white LED devices and UV LED devices in a light source to be able to provide light similar to natural light and can operate the light source to emit light using power from a mobile terminal. A face-only photo booth according to the present invention, as described above, has a simple structure that can be operated by power from a mobile terminal, so it is possible to expect an effect that the face of a person to be photographed can be photographed regardless of place and time.

BEST MODE

Figure 1:
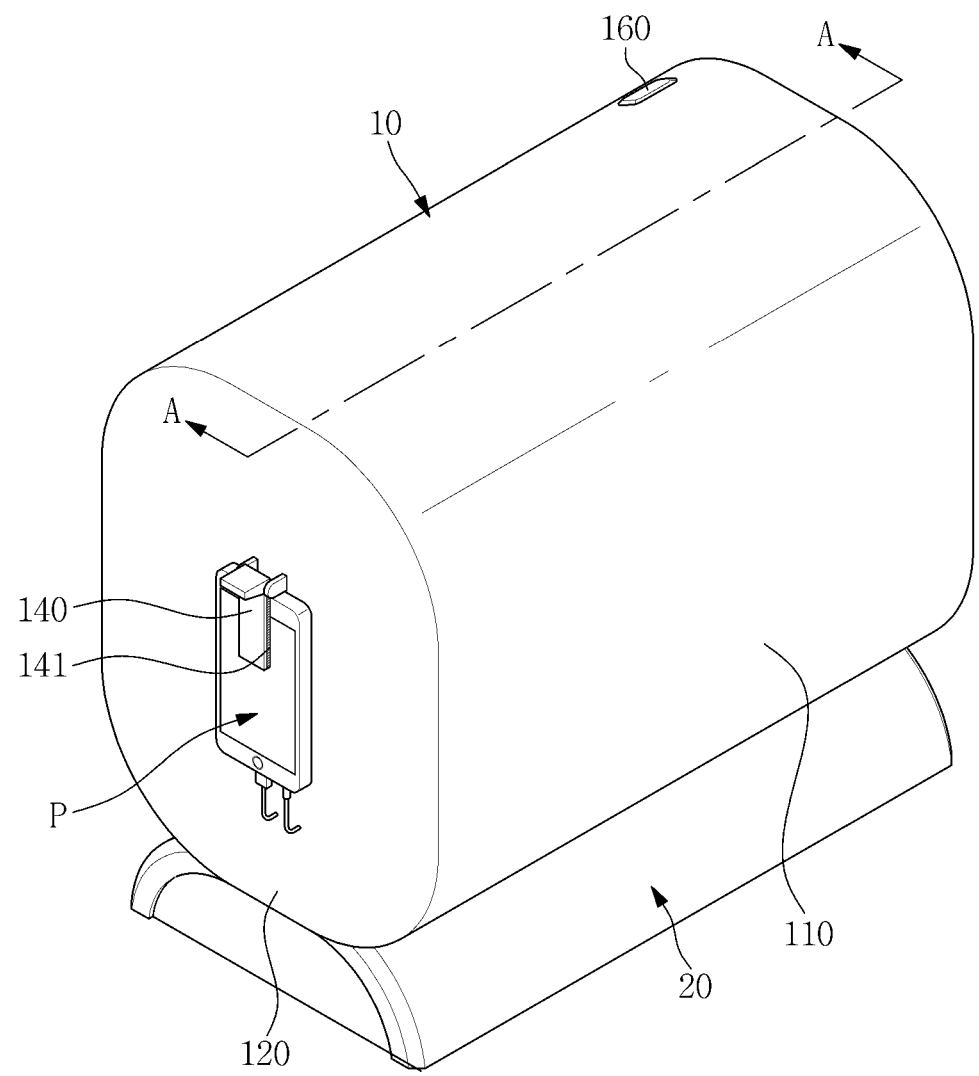
FIG. 1 is a perspective view schematically showing the state when a mobile terminal has been mounted on a face-only photo booth according to an embodiment of the present invention.
Figure 2:
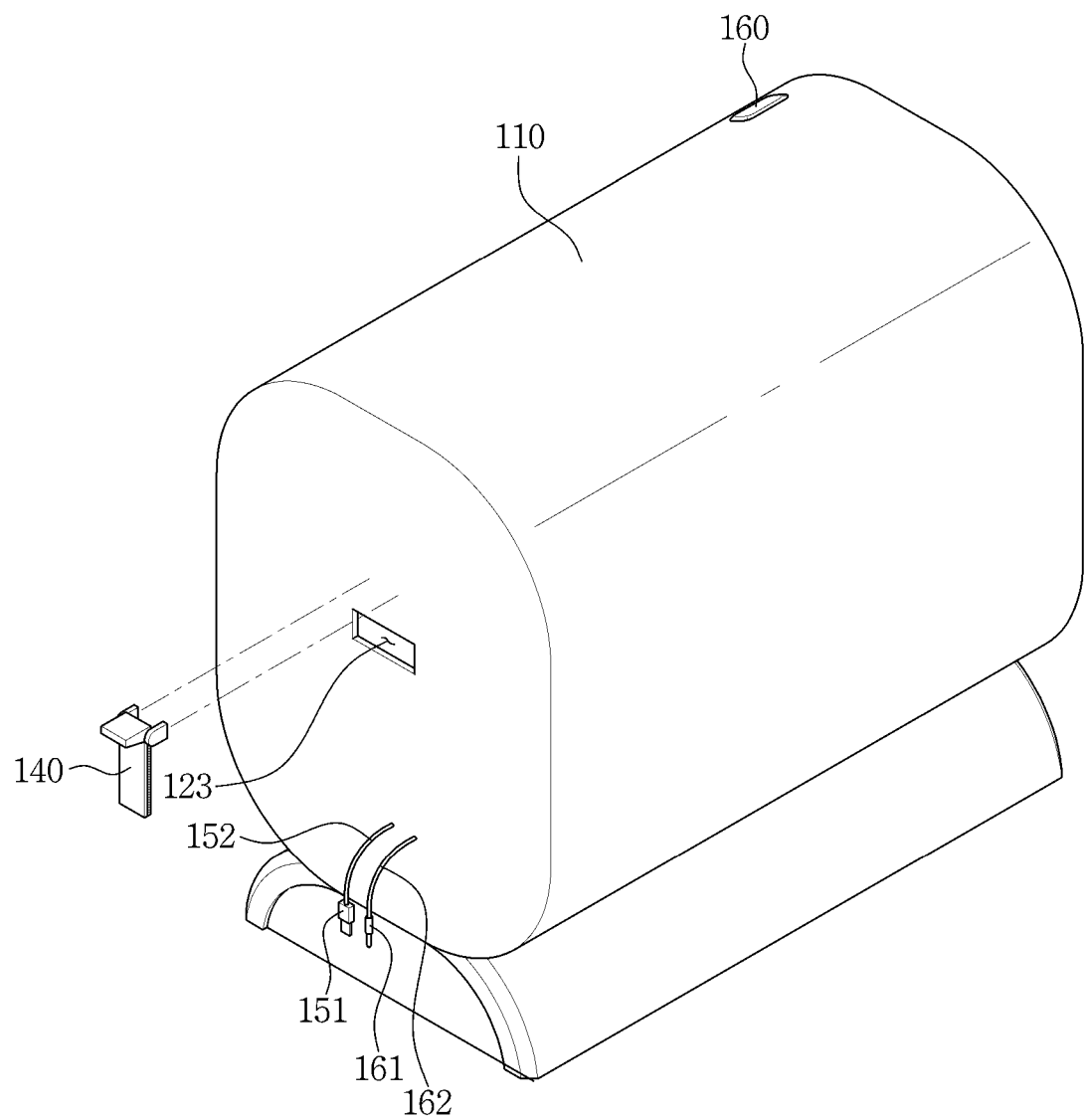
FIG. 2 is a perspective view showing the face-only photo booth according to an embodiment of the present invention from a side with a clamp separated to check a through-hole formed on a side of a housing.
Figure 3:
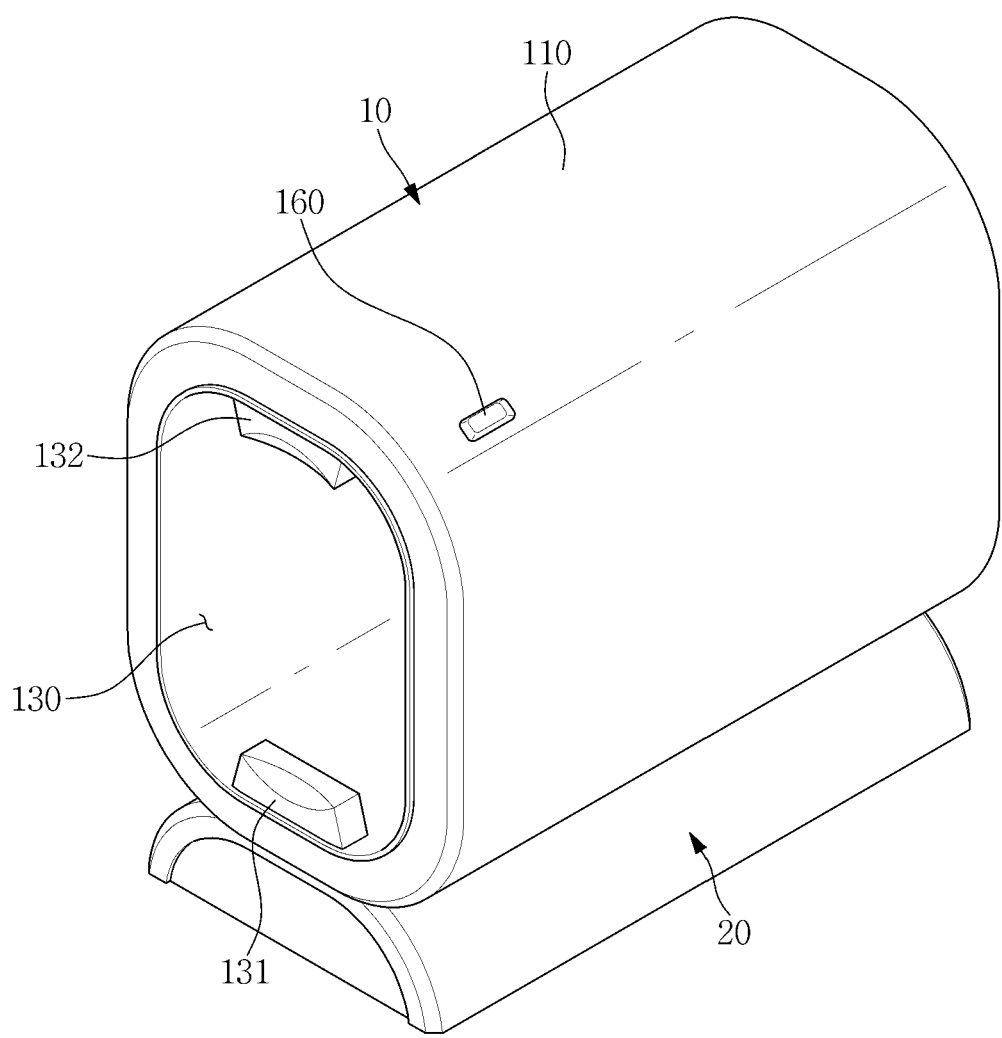
FIG. 3 is a perspective view showing the face-only photo booth according to an embodiment of the present invention from another side.
Figure 4:
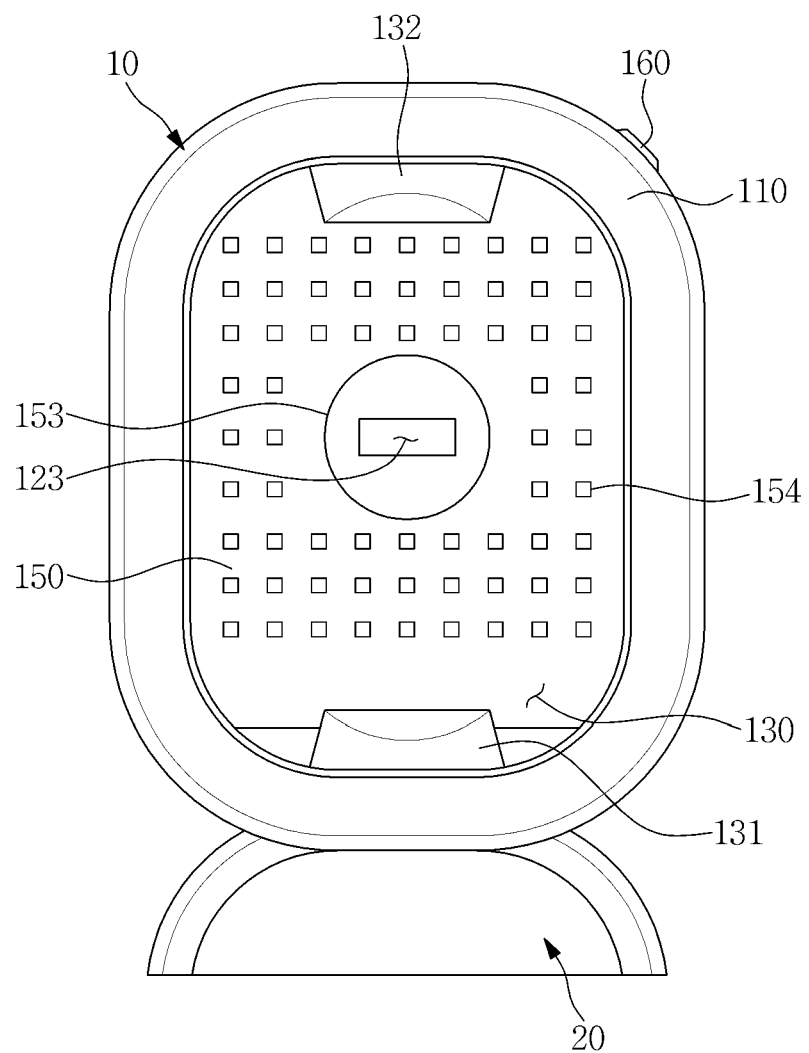
FIG. 4 is a front view showing the face-only photo booth of the present invention shown in FIG. 2 from another side.

The objects, specific advantages, and new characteristics of the present invention will become more apparent from the following detailed description and embodiments associated with the accompanying drawings. It should be noted that when components are given reference numerals, same components are given the same reference numerals in this specification even if they are shown in different drawings. However, in describing the present invention, detailed descriptions of well-known technologies will be omitted so as not to obscure the description of the present invention with unnecessary detail. In this specification, the terms 'first', 'second', etc. are used to discriminate a component from another component and the components are not limited by the terms. In the accompanying drawings, some components are exaggerated, omitted, or schematically shown and the sizes of components do not completely reflect the actual sizes.

Hereafter, embodiments of the present invention are described in detail with reference to the accompanying drawings.

FIGS. 1 to 5 are views schematically showing a face-only photo booth according to an embodiment of the present invention. The face-only photo booth can not only photograph a face through a camera on a mobile terminal without a separate built-in photographing device, but also radiate light using power that is supplied from the mobile terminal.

The mobile terminal is an electronic device such as a mobile phone, a smartphone, a Personal Digital Assistant (PDA), and a tablet PC equipped with a high-quality camera module for photographing.

The face-only photo booth according to an embodiment of the present invention schematically includes a housing 10 having an opening 130 on a second side in which a person to be photographed can put the face and having a through-hole 123 on a first side in which a camera P1 of a mobile terminal P can be disposed. Selectively, the present invention may include a base 20 under the housing 10 to stably seat the housing 10 on a work table.

As shown in the figures, the housing 10 has a tubular wall 110 with an empty inside and a side 120 closing a first side of the wall 110, so it is formed in a flowerpot shape with an open second side. The wall and the first side of the housing 10 may be made of an opaque material to provide a condition like a sealed chamber where photographing is possible under any conditions, or a light shield layer may be coated on or applied to the inner surface of the wall and the inner surface of the first side.

In other words, the housing 10 has the opening 130 on the second side opposite the first side 120 in which the face of a person to be photographed is positioned. Accordingly, the housing 10 should be formed in a size and shape such that the face of a person to be photograph can be disposed inside the housing 130. The present invention may have a chin support 131, which supports the chin of a person to be photographed, at a lower portion of the opening 130. Further, the present invention may have a forehead support 132, which supports a forehead, at an upper portion of the opening 130 of the housing 10. A person to be photographed can put his/her face in a position toward the camera P1 through the chin support 131 and the forehead support 132, thereby being able to effectively bring the face in close contact with the opening 130.

The housing 10 has a through-hole 123 formed in the thickness direction through the first side 120. The camera P of the mobile terminal P can be seated/disposed in the through-hole 123 and should be able to sufficiently accommodate the camera P1. Currently, it is possible to secure an elegant design for smartphones by making them slim, but high-quality cameras protrudes from the rear surface of mobile terminals in some cases. According to the present invention, the flat rear surface of mobile terminals is supposed to be brought in close contact with the first side 120 of the housing 10 such that not only the position of mobile terminals can be fixed, but also unexpected flare (spread of light) due to sunlight or surrounding light traveling inside between the camera P1 and the rear surface can be prevented. To this end, the through-hole 123 may have a size that can accommodate a camera module having the camera P1, a flash, etc.

As described above, according to the face-only photo booth according to an embodiment of the present invention, the mobile terminal P is supposed to be disposed on the first side 120 of the housing 10 and to photograph the face of a person to be photographed that is positioned in the opening 130 at the second side of the housing 10. To this end, the face-only photo booth includes a clamp 140 that helps the camera P1 of the mobile terminal P be able to be accurately positioned in the through-hole 123 of the first side 120. The present invention, as shown in the figures, includes the clamp 140 that can support and hold a mobile terminal on the first side and the clamp 140 can sufficiently support and hold the mobile terminal P. The present invention can firmly support and hold mobile terminals having various sizes on the first side by means of the clamp. For reference, the clamp 140 shown in FIG. 1 has a forceps shape with an arm that can rotate in a hinge type. The arm of the clamp 140 is pressed to the first side 120 of the housing 10 by, for example, the force of a spring (not shown) disposed around a hinge. Particularly, the arm presses a display disposed opposite the camera module in a mobile terminal.

The clamp 140 may have a nonslip pad 141 made of an elastic material such as rubber or urethane and disposed on the inner surface that comes in contact with the front surface of the mobile terminal P, in detail, the display. The non-slip pad 141 can prevent a mobile terminal from slipping and preclude damage to a display due to pressing by the clamp. Further, the rotational center of the clamp 140 is disposed over the through-hole 123 on the first side 120, that is, opposite to a lower portion to which an ear jack or a USB terminal is connected. In general, an earphone socket (or an audio output terminal, not shown) and an USB socket (or a charging socket, not shown) are disposed at the lower end of the mobile terminal P, particularly, smartphones. Therefore, according to the present invention, the rotational center of the clamp 140 is disposed over the through-hole 123 to easily couple an ear jack 161 and an USB terminal 151 to an earphone socket and an USB socket of smartphones.

According to an aspect of the present invention, the clamp 140 has a forceps shape and the rotational center of the clamp 140 is positioned over the through-hole 123. Accordingly, an ear jack and a USB terminal are easily connected. Further, according to researches of the inventor(s), it was found out that it is possible to firmly fix a mobile terminal using the clamp 140. Further, this structure has an effect that the face-only photo booth can be applied regardless of the different positions of camera modules of mobile terminals.

The present invention includes a light source 150 on the inner surface of the first side 120 to be able to uniformly provide light without a shape on the face of a person to be photographed positioned inside the opening 130. The light source 150 is supplied with power that is the electrical energy of a battery disposed in the mobile terminal P by inserting the USB terminal 151 at an end of a USB cable 152 in the USB socket of the mobile terminal P. The USB cable 152 may be disposed in the housing 10 (the portion inside the housing is indicated by a dotted line), and as described above, the USB terminal 151 is disposed at an end of the USB cable 152 and the other end of the USB cable 152, for example, may be electrically connected to a Printed Circuit Board (PCB) of the light source 150. The PCB of the light source can be supplied with power for driving a plurality of LED devices 154 disposed on the second side from a mobile terminal through the USB cable, and can control a light emission state. The light source 150 may include a plurality of LED devices 154 that can emit light even with low power of a mobile terminal that provides a voltage of about 5.0V. For reference, the LED devices 154 of the light source 150 may be UV LED devices or may include UV LED devices that are white LED devices and UV LED devices. The LED devices 154 may be distributed circumferentially or in a lattice shape with predetermined gaps around a second through-hole 153 formed in the inside area of the light source 150. The second through-hole 153 is formed to correspond to the through-hole 123 formed at the first side 120 such that the camera P1 of the mobile terminal disposed on the through-hole 123 can photograph the face of a person to be photographed.

Selectively, in the present invention, a diffusion plate (not shown) may be additionally disposed between the light source 150 and the opening 130. The light radiated from the light source can be diffused and uniformly distributed on the face of a person to be photographed through the diffusion plate. Obviously, a separate through-hole should be formed through the diffusion plate at a position corresponding to the through-hole 123.

Figure 5:
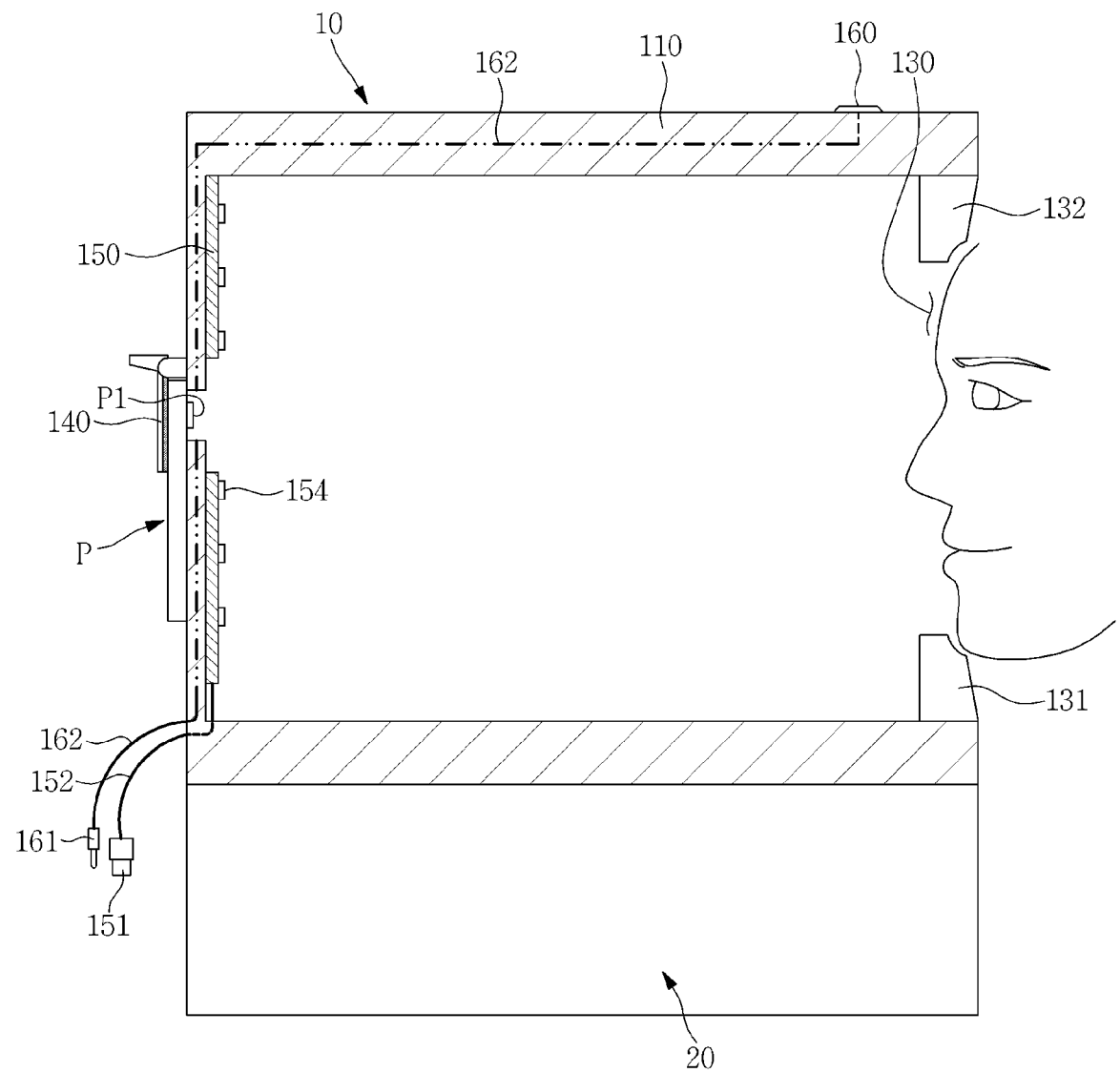
FIG. 5 is a cross-sectional view schematically showing the face-only photo booth taken along line A-A of FIG. 1.

Further, according to the present invention, an operation button 160 for inputting a photographing signal is disposed on the outer side of the housing 10 so that a person to be photographed with the face seated inside the opening 130 of the housing 10 can photograph by himself/herself. The present invention may include a cable 162 at an end of the ear jack 161 that is inserted into an earphone socket that is an audio output terminal of a mobile terminal, for example, a smartphone in order to transmit a photographing signal from the operation button 160 to the mobile terminal. As shown in FIG. 5, a portion of the cable 162 is disposed in the housing 10 and this portion is indicated by a two-dot chain line.

Schematically, according to the present invention, the USB terminal 151 extending out from the first side of the housing 10 is coupled to the USB socket of a mobile terminal and the ear jack 161 extending out from the first side of the housing 10 is coupled to an earphone socket of a mobile terminal. The mobile terminal P is fixed on the first side of the housing by the clamp 140 after the camera P is aligned with the through-hole 123 of the first side 120. Next, a person to be photographed puts his/her face in close contact with the opening 130 of the housing 10 and then presses the operation button 160 on the housing 10, whereby a photographing signal is input to the mobile terminal mounted on the housing 10. Accordingly, photographing can be easily performed.

Figure 6:
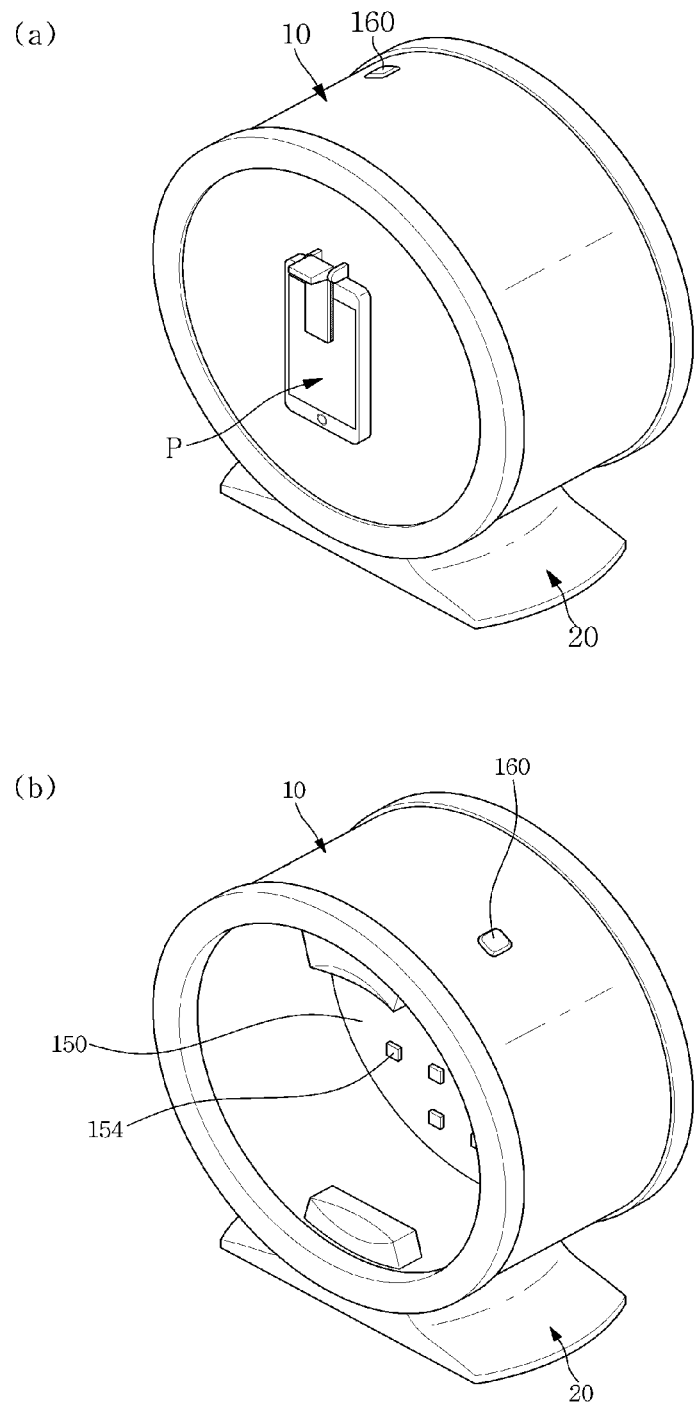
FIG. 6A is a perspective view showing a face-only photo booth according to another embodiment of the present invention from a side and FIG. 6B is a perspective view showing the face-only photo booth shown in FIG. 6A from another side.

FIG. 6 is a view schematically showing a face-only photo booth according to another embodiment of the present invention.

As shown in the figure, a face-only photo booth according to another embodiment of the present invention includes a housing 10 generally having a circular cross-section. Further, the present invention may have various cross-sectional shapes and sizes that can accommodate a face.

Figure 7:
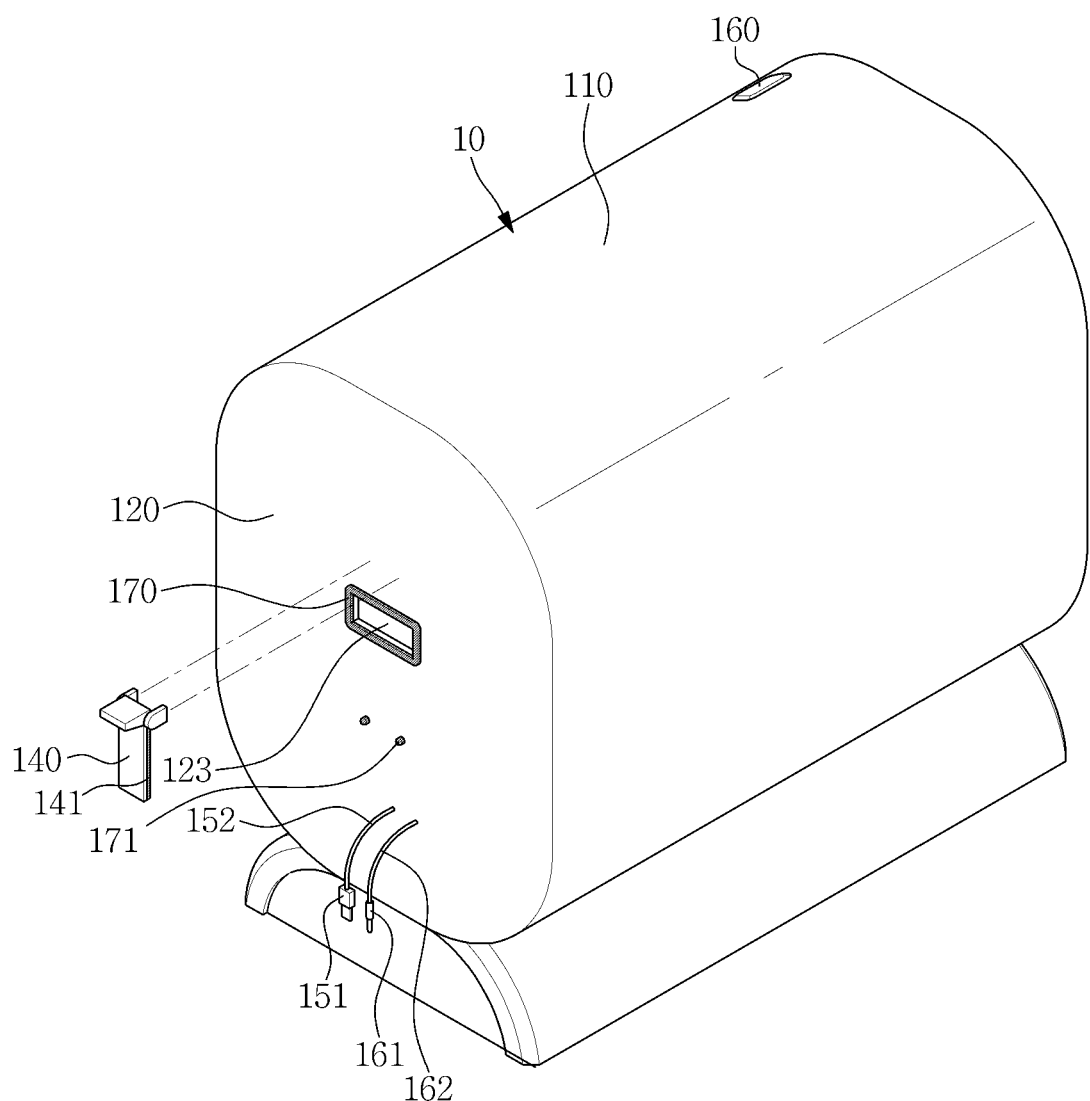
FIG. 7 is a perspective view showing the face-only photo booth according to another embodiment of the present invention from a side with a clamp separated to check a through-hole formed at a side of a housing.

FIG. 7 is a perspective view showing a face-only photo booth according to another embodiment of the present invention from a side. This face-only photo booth according to another embodiment of the present invention is very similar to the face-only photo booth shown in FIGS. 1 to 5 except for the through-hole. Accordingly, the description of the same components is not described to help clearly understand the present invention.

As shown in the figures, the first side 120 of the housing 10 has a through-hole 123 formed in the thickness direction through the first side such that a camera P1 of a mobile terminal can be disposed therein (see FIG. 5).

The face-only photo booth according to another embodiment of the present invention has a structure that can prevent external light from unnecessarily traveling inside through the through-hole 123 by enabling the rear side of the mobile terminal P (see FIG. 1) to come in close contact with the portion around the through-hole 123 of the first side 120. To this end, face-only photo booth according to another embodiment of the present invention has a ring-shaped sealing portion 170 disposed around the edge of the through-hole 123. The ring-shaped sealing portion 170 may be made of an elastic material such as rubber and urethane. The ring-shaped sealing portion 170 is positioned between a camera of a mobile terminal and the through-hole 123, thereby being able to preclude flare by preventing light from unnecessarily traveling inside therebetween. Further, the ring-shaped sealing portion 170 may be made of rubber or urethane with a high friction coefficient such that a clamp 140 does not slide down due to large traveling resistance when the clamp 140 is pressed. Obviously, the ring-shaped sealing portion 170 seals the portion between the rear side of a mobile terminal and the through hole 123 and prevents damage to the rear side of the mounted mobile terminal, as described above, by being pressed by the clamp.

Further, the face-only photo booth according to another embodiment of the present invention has one or more spacers 171 protruding perpendicular to the first side 120 under the through-hole 123. The one or more spacers 171 may be made of the same elastic material as the ring-shaped sealing portion 170. The one or more spacers 171 may have the same protrusive height as the ring-shaped sealing portion 170, so a mobile terminal can be arranged in parallel with the first side 120.

Although the present invention was described above through embodiments, the embodiments are provided only for describing the present invention in detail and a face-only photo booth according to the present invention is not limited to the embodiments. Further, it should be understood that the present invention may be changed and modified by those skilled in the art without departing from the spirit of the present invention.

Simple changes and modifications of the present invention are all included in the scope of the present invention and the detailed protective range of the present invention will be clear from the accompanying claims.

What is claimed is:

1. A face-only photo booth comprising:
   a housing (10) having a tubular wall (110), a first side (120) having a through-hole (123) on a side of the wall (110), and an opening (130) formed on the other side of the wall (110) such that a face of a person to be photographed can be put therein;
   a clamp (140) bringing a mobile terminal (P) in close contact with the first side (120) such that a camera (P1) of the mobile terminal (P) can be aligned with the through-hole (123) of the housing (10);
   a light source (150) disposed on an inner surface of the first side (120) of the housing (10); and
   an operation button (160) disposed on an outer side of the wall (110) to input a photographing signal of the mobile terminal (P),
   wherein a rotational center of the clamp (140) is disposed over the through-hole (123) on the first side (120).

2. The face-only photo booth of claim 1, wherein the light source (150) has a plurality of LED devices (154), a USB cable (152) supplying power of the mobile terminal (P) to the light source, and a USB terminal (151) connected to an end of the USB cable and being coupled to a USB socket of the mobile terminal (P).

3. The face-only photo booth of claim 1, wherein the light source (150) has a second through-hole (153) formed in an inside area of the light source to correspond to the through-hole (123).

4. The face-only photo booth of claim 1, wherein the light source (150) radiates light to the face of a person to be photographed through LED devices including UV LED devices.

5. The face-only photo booth of claim 1, wherein the operation button (160) has a cable (162) transmitting a photographing signal from the operation button to the mobile terminal (P), and an ear jack (161) connected to an end of the cable (162) and being coupled to an earphone socket of the mobile terminal (P).

6. The face-only photo booth of claim 1, wherein the opening (130) has a chin support (131) supporting a chin of a person to be photographed, and a forehead support (132) supporting a forehead of the person to be photographed.

7. The face-only photo booth of claim 1, wherein the clamp (140) further has a nonslip pad (141) made of an elastic material on an inner surface that comes in contact with the mobile terminal.

8. The face-only photo booth of claim 1, wherein the housing (10) further has a ring-shaped sealing portion (170) made of an elastic material and disposed around an edge of the through-hole (123) of the first side (120).

9. A face-only photo booth comprising:
   a housing (10) having a tubular wall (110), a first side (120) having a through-hole (123) on a side of the wall (110), and an opening (130) formed on the other side of the wall (110) such that a face of a person to be photographed can be put therein;
   a clamp (140) bringing a mobile terminal (P) in close contact with the first side (120) such that a camera (P1) of the mobile terminal (P) can be aligned with the through-hole (123) of the housing (10);
   a light source (150) disposed on an inner surface of the first side (120) of the housing (10); and
   an operation button (160) disposed on an outer side of the wall (110) to input a photographing signal of the mobile terminal (P),
   wherein the housing (10) further has a ring-shaped sealing portion (170) made of an elastic material and disposed around an edge of the through-hole (123) of the first side (120), and
   wherein the housing (10) further has one or more spacers (171) made of an elastic material and protruding outward from a portion under the through-holes (123) of the first side (120).

10. The face-only photo booth of claim 9, wherein the ring-shaped sealing portion (170) and the one or more spacers (171) protrude at the same height.

* * * * *